United States Patent
Kapsales et al.

(10) Patent No.: US 6,330,315 B1
(45) Date of Patent: Dec. 11, 2001

(54) APPARATUS AND METHOD FOR ROUTING BLOCKED CALLS

(75) Inventors: Peter Kapsales, Holmdel; Barry Shawn Seip, New Providence, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/100,608

(22) Filed: Jun. 19, 1998

(51) Int. Cl.[7] .................................................... H04M 3/00
(52) U.S. Cl. ............... 379/196; 379/114.21; 379/114.24; 379/123
(58) Field of Search .................... 379/188, 194, 379/196, 199, 200, 201.01–201.12, 112.01–112.1, 114.01–114.29, 118, 123, 127.01–127.06, 132, 142.01–142.18, 143, 144.01–144.08

(56) References Cited

U.S. PATENT DOCUMENTS

| | | | |
|---|---|---|---|
| 4,251,692 | * 2/1981 | Waldman | 379/131 |
| 4,390,750 | 6/1983 | Bartelink | 379/42 |
| 4,926,470 | * 5/1990 | Sanford | 379/199 |
| 4,935,956 | * 6/1990 | Hellwarth et al. | 379/112 |
| 5,109,408 | 4/1992 | Greenspan et al. | 379/197 |
| 5,200,995 | * 4/1993 | Gaukel et al. | 379/200 |
| 5,353,335 | * 10/1994 | D'Urso et al. | 379/67.1 |
| 5,436,957 | * 7/1995 | McConnell | 379/196 |
| 5,563,933 | * 10/1996 | August et al. | 379/115 |
| 5,566,234 | * 10/1996 | Reed et al. | 379/188 |
| 5,850,432 | * 12/1998 | Desai et al. | 379/115 |
| 5,963,625 | * 10/1999 | Kawecki et al. | 379/114 |
| 6,154,532 | * 11/2000 | Lockhart et al. | 379/143 |
| 6,222,912 | * 4/2001 | Breuer | 379/114 |
| 6,263,056 | * 7/2001 | Gruchala et al. | 379/114 |

\* cited by examiner

*Primary Examiner*—Harry S. Hong
*Assistant Examiner*—Benny Q. Tieu
(74) *Attorney, Agent, or Firm*—Oliff & Berrdige, PLC

(57) ABSTRACT

The present invention provides a blocked call routing apparatus and method that allows a caller to access a blocked number, such as a 1-8YY paging service, from a restricted device. The blocked call routing apparatus includes a controller, a database interface and a network interface. The blocked call routing apparatus receives call signals through the network interface and retrieves information from a database, through the database interface, corresponding to the source type and call destination address. Based on the information obtained from the database, the blocked call routing apparatus determines whether the call is blocked or unblocked. If the call is blocked, the blocked call routing apparatus queries the called party to determine if they wish to accept the additional charges necessary to complete the call. If they do, the block is overridden and the call is completed. Otherwise, the blocked call routing apparatus queries the calling party to determine if they wish to accept the additional charges necessary to complete the call. If the calling party accepts the charges, the blocked call routing apparatus then queries the calling party for billing information. The blocked call routing apparatus then verifies the billing information entered and, if the information is valid, overrides the block and completes the call.

12 Claims, 3 Drawing Sheets

APPARATUS AND METHOD FOR ROUTING BLOCKED CALLS

BACKGROUND OF THE INVENTION

1. Field of Invention

The invention provides an apparatus and method for routing blocked calls based on the entry of an override condition, such as the acceptance of additional charges and the entry of billing information.

2. Description of Related Art

As the costs of providing telecommunications services increase, service providers are responding by implementing various techniques in an effort to reduce these costs. One such technique involves the blocking of all telephone calls from particular types of calling devices.

For example, 1-800 and 1-888 service providers (collectively called 1-8YY service providers) have recently realized that calls to their toll-free telephone lines from pay telephones present additional charges that they do not wish to incur. When a caller uses a pay telephone to call the toll-free number, the caller is not required to absorb any of the cost for the call. However, the owner of the pay telephone automatically bills the 1-8YY service provider for the toll-free call. Typically, the 1-8YY service provider will be charged a surcharge of between 10 and 35 cents per call by the owner of the pay telephone. For example, if a caller uses a pay telephone to check his/her messaging service, it may only take one minute to complete the call. This will result in minimal telecommunication charges of approximately 10 cents. However, the total cost for the call will jump to between 20 and 45 cents when the pay telephone surcharges are applied. This cost must be absorbed by the messaging service provider.

Thus, the 1-8YY service provider, in addition to the charge for the time of the call, will incur an additional 10 to 35 cents per call for each pay telephone call. This cost can be quite substantial when accumulated over many such calls. Ultimately, this cost is passed on to the customers of the 1-8YY service provider through higher prices on products and services. As a result, a seemingly toll-free call from a pay telephone is in fact more costly to the calling party.

As a result of the above, more and more 1-8YY service providers have decided to block all calls originating from pay telephones. This practice causes severe inconveniences for customers who need to, but cannot, access a service from a pay telephone. For example, a customer having a 1-8YY paging service with voice mail may not be able to check his/her messages from a pay telephone since it would require that he/she call the 1-8YY telephone number from a blocked calling device.

Thus, there is a need for new technology that will allow a 1-8YY service provider to reduce costs of providing their service while at the same time allowing customers to access the 1-8YY service from restricted devices.

SUMMARY OF THE INVENTION

The present invention provides a blocked call routing apparatus and method that allows a caller to access a blocked number from a restricted device. The blocked call routing apparatus includes a controller, a database interface and a network interface. When a calling party initiates a call to a called party, the blocked call routing apparatus receives call signals from the calling party through the network interface and retrieves information from a database, through the database interface, corresponding to the source type and call destination address. Based on the information obtained from the database, the blocked call routing apparatus determines whether the call is blocked or unblocked. If the call is blocked, the blocked call routing apparatus queries the called party to determine if they wish to accept the additional charges necessary to complete the call. If they do, the call is completed. Otherwise, the blocked call routing apparatus queries the calling party to determine if they wish to accept the additional charges necessary to complete the call.

If the calling party accepts the charges, the blocked call routing apparatus then queries the calling party for billing information, verifies the billing information entered and, if the information is valid, completes the call. Otherwise, the call is terminated.

In a second embodiment, the blocked call routing apparatus determines if the owner of the source device has blocked the call based on the type of destination address entered and the source of the call. If a call is blocked, the blocked call routing apparatus queries the calling party for an override condition, such as the entry of a personal identification number, a code, billing information, and the like. When the override condition is acquired, the blocked call routing apparatus completes the call.

BRIEF DESCRIPTION OF THE DRAWINGS

The invention is described in detail with reference to the following figures wherein like numbers designate similar items, and wherein.

DETAILED DESCRIPTION OF PREFERRED EMBODIMENTS

Figure 1:
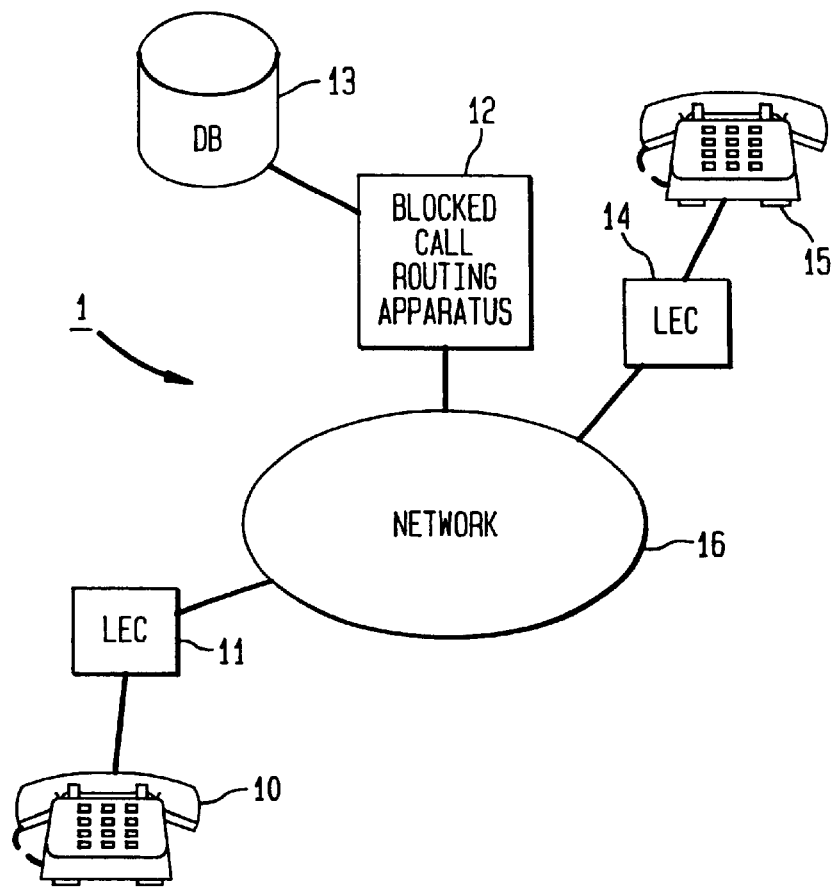
FIG. 1 is a block diagram of an exemplary telecommunications system incorporating a blocked call routing apparatus according to the present invention.

FIG. 1 is a block diagram of a telecommunications system 1 incorporating a blocked call routing apparatus 12 according to the present invention. The telecommunications system 1 shown in FIG. 1 includes one or more user devices 10 and 15 in communication with at least one network 16 through local exchange carriers (LECs) 11 and 14. The telecommunications system 1 further includes at least one blocked call routing apparatus 12 in communication with the network 16.

The user devices 10 and 15 communicate with one another over the network 16 through LECs 1 1 and 14. If the operator of the user device 10 wishes to communicate with the user device 15, the operator need only activate the user device 10 and enter the destination address, for example the telephone number, of the user device 15. Once a connection is established, communication between the user devices 10 and 15 may commence.

The user devices 10 and 15 may be any such device that allows for the transmission of signals over telecommunications links. For example, the user device may be a land-line telephone, cellular telephone, computer, personal assistant, point of sale device, and the like. For simplicity, the following description will assume that the user devices 10 and 15 are land-line telephones.

The user devices 10 and 15 are in communication with the network 16 through LECs 11 and 14 over telecommunications links. These telecommunications links may be any type of connection that allows the transmission of information. Some examples include conventional telephone lines, fiber optic lines, direct serial connection, and the like.

The user devices 10 and 15 send communication signals to one another over the telecommunications links through LECs 11 and 14. The communication signals are received by the network 16 and are routed, by way of switches (not shown) in the network 16, to the receiving user device 10, 15. These switches may be, for example, Lucent Technologies Inc. 5ESS and 4ESS switches as are generally known in the art.

The network 16 may be a single network or a plurality of networks. For example, the network 16 may include a local telephone network (such as a Bell Atlantic telephone network) in connection with a long distance network (such as an AT&T long distance telephone network).

The network 16 includes at least one blocked call routing apparatus 12 that has access to database 13. The blocked call routing apparatus 12 may be a single processor or may be a distributed processing system incorporated into the network 16. For simplicity, the following description will assume the blocked call routing apparatus 12 to be a single device, as shown in FIG. 1, in communication with a single network 16.

When the communications signals are received by the network 16, they are routed to the blocked call routing apparatus 12 where the call is processed to determine if the call is blocked. For example, the blocked call routing apparatus 12 may determine the source of the call and/or source type by sampling the information contained in the call signals to determine, for example, the Number Plan Area (NPA) of the telephone number of the user device 10, the switch type from which the call signals are received (for example, a 4ESS switch is typically used for residential telephone numbers and a 5ESS switch is used for business and pay telephone numbers), an identification code associated with the user device 10 ( for example, the "ii" digits associated with pay telephones), and the like.

After determining the source or source type, the blocked call routing apparatus 12 retrieves information from the database 13 corresponding to the destination address entered by the calling party. The information stored in database 13 includes a listing of source devices or source device types that are blocked. In other words, the database 13 includes a listing of blocked devices from which calls are not to be received without an override condition having been acquired.

The blocked call routing apparatus 12, after retrieving the database information from database 13, compares the source or source type of the calling party user device 10 with the list of blocked device to determine if the calling party user device 10 falls within the list. Thus, the blocked call routing apparatus 12 may determine that the call originates from, for example, a pay telephone, residential telephone, business telephone, and the like, and determine, by retrieving information from the database 13 corresponding to the called telephone number, that calls from this source to the called telephone number are blocked.

The call may be blocked due to requests from the owner of the receiving user device 15. For example, a 1-8YY service provider may block all calls to their user device 15 that originate from pay telephones in order to avoid the additional surcharge that is charged by the owner of the pay telephone.

If the call is blocked, the blocked call routing apparatus 12 may send a message to the owner of the called telephone number, asking whether they wish to incur the additional charges necessary for the call to be completed. If the owner does not wish to incur the charges, the blocked call routing apparatus 12 will then send a message to the calling party, user device 10, informing the calling party that additional charges are required and requesting authorization to bill the calling party for the additional charge. Both of the above messages may be prerecorded or synthesized messages from text that may be updated as appropriate.

The authorization may be obtained by receiving signals in response to the calling or called party entering their response through manual keyboard entry, telephone keypad entry, voice recognition, manipulation of a pointing device, touch-screen display and the like. For example, the calling party may provide authorization by responding to a voice menuing type message such as "press 1 to accept additional charges. Press 2 to disconnect." Additionally, a security code may be required for accepting the additional charges. The security code may be a personal identification number (PIN), password or the like, that is issued to the calling party by the owner of the telecommunications network 16, the owner of the called user device 15, or the like.

If the additional charges are accepted by the calling party, the blocked call routing apparatus 12 may send a request for the calling party's billing information so that the calling party may be billed for the additional charges required for the completion of the call. This billing information may include the entry of a credit card number, calling card number, home telephone number, account number and the like. For additional security, a code, such as a PIN, social security number, home zip code and the like, may be required for use of the particular billing information entered. After all the necessary billing information is entered, the blocked call routing apparatus 12 will verify the billing information and complete the call to the called party's user device 15. The charges for completion of the call will then be billed to the calling party in accordance with the billing information entered.

Figure 2:
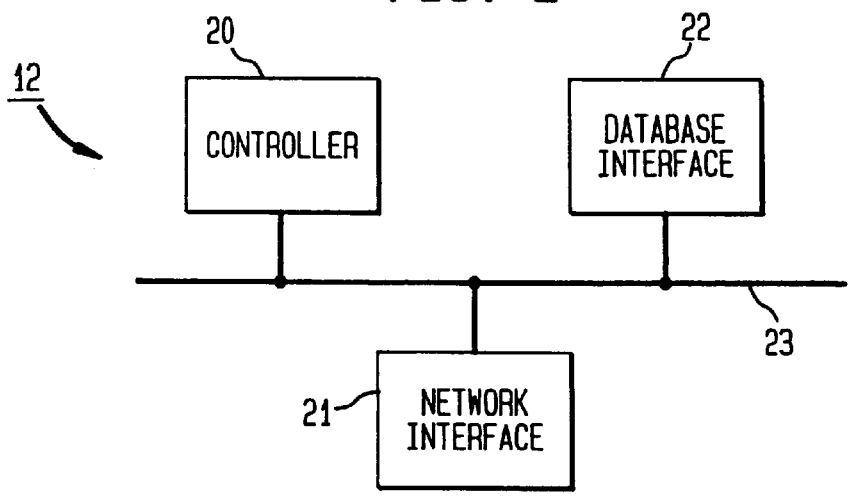
FIG. 2 is a block diagram of the blocked call routing apparatus of FIG. 1.

FIG. 2 is a block diagram of the blocked call routing apparatus 12 of FIG. 1. As shown in FIG. 2, the blocked call routing apparatus 12 includes a controller 20, network interface 21 and database interface 22. These devices are in communication with one another through bus 23. The controller 20 controls the flow of information along bus 23 to and from the network interface 21 and database interface 23 and performs the functions of the blocked call routing apparatus 12.

When a calling party 10 wishes to call a called party 15, the calling party enters the telephone number of the called party and call signals are sent from the calling party 10 to the network 16 through LEC 11. These call signals are received by the blocked call routing apparatus 12 through the network interface 21. The call signals are sent from the network interface 21 to the controller 20 via bus 23.

When the call signals are received, the controller 20 determines the source of the call based on information contained in the call signals. This may include, for example, information contained in a header signal identifying the telephone number of the calling party, the "ii" digits for a pay telephone, and the like. Based on this information, the controller 20 can determine what type of device, e.g. residential telephone, pay telephone, etc., is the source of the call.

Once the controller 20 determines the type of device initiating the call (source type), the controller 20 retrieves information from the database 13 through database interface 22 that corresponds to the called party's telephone number and the source type of the call. The information retrieved identifies whether the call from the determined device type to the called party telephone number is blocked or unblocked.

If the call is unblocked, the call can be completed without any additional interference by the blocked call routing apparatus 12. In this case, the controller 20 forwards the call to the receiving party via the network interface 21.

If the call is blocked, then the controller 20 sends a request message to the called telephone number requesting authorization to complete the call and charge the additional fees for completion of the call. This request message may be a prerecorded message, synthesized voice message, and the like. The message will typically provide a menu of possible options for responding to the message. The message may include, for example, the phrases "An additional charge of twenty five cents is required for completion of this call. Press '1' to accept the additional charge. Press '2' to decline the additional charge."

If the called party refuses the additional charges, the controller 20 will send a second request message to the calling party requesting authorization to complete the call and charge the calling party for the additional fees for completion of the call.

If neither the owner of the called telephone number nor the calling party wish to accept the additional charges, the call is terminated. If the called party accepts the additional charges, then the block is overridden and his/her telephone number account is billed accordingly and the call is completed. If the called party refuses the additional charges and the calling party accepts them, then the controller 20 sends a message to the calling party requesting that the calling party enter their billing information for billing the additional charges. An exemplary billing message may be "Please enter the account number of the calling card or credit card to which the additional charges are to be billed and press the '#' key. <monitor number entered> Now enter your personal identification number" and the like.

After receiving the billing information, the controller 20 may verify the information by calling the telephone number of the institution that issued the calling card or credit card and verifying the account number and personal identification number. This type of automatic verification is performed in the manner generally known in the art.

Once the calling party has entered their billing information and it has been verified, the controller 20 overrides the block and completes the call to the called party by forwarding the call via the network interface 21 to the called party's telephone 15.

Figure 3:
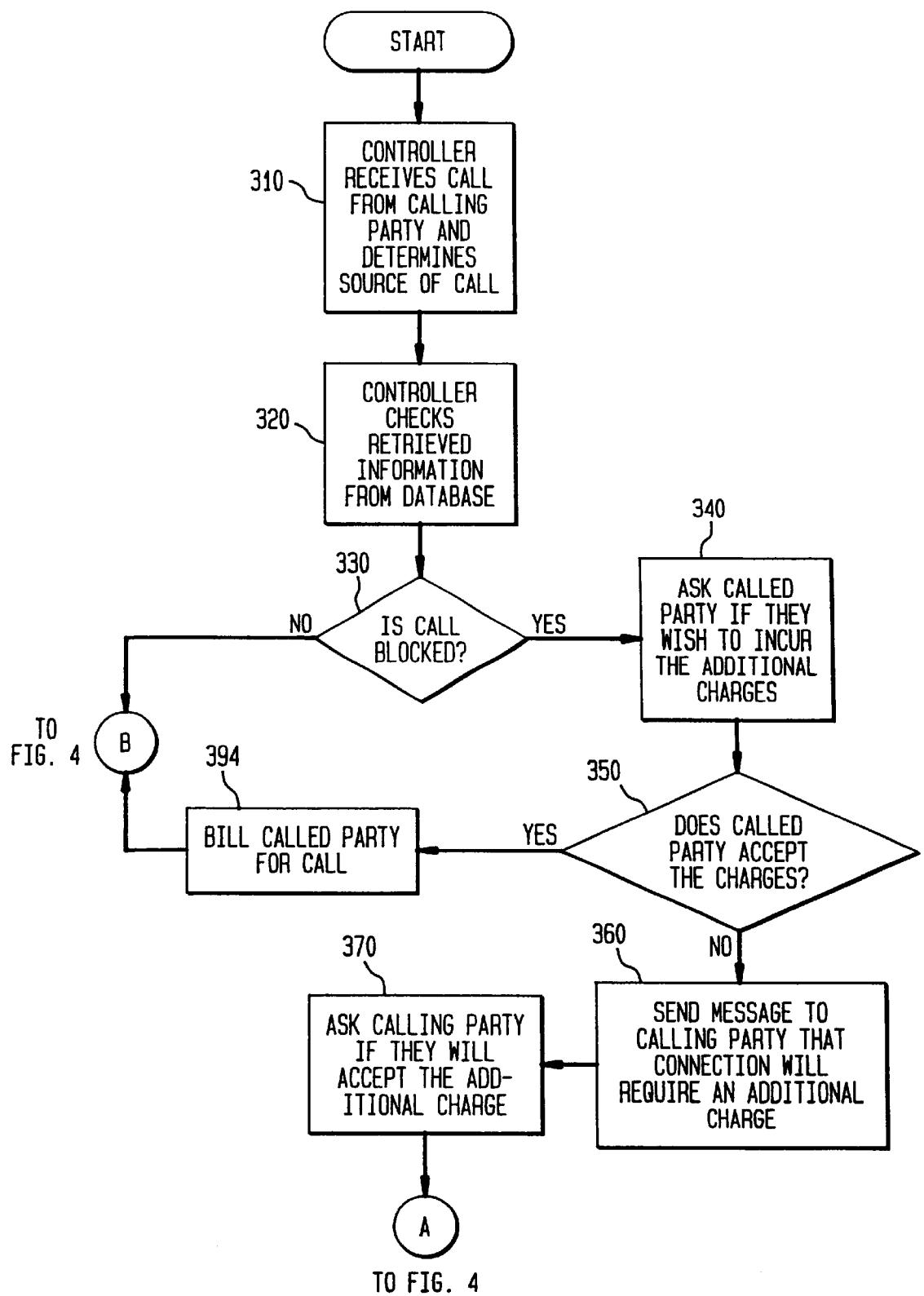
FIGS. 3 and 4 are flowcharts of the operation of the blocked call routing apparatus according to the present invention.
Figure 4:
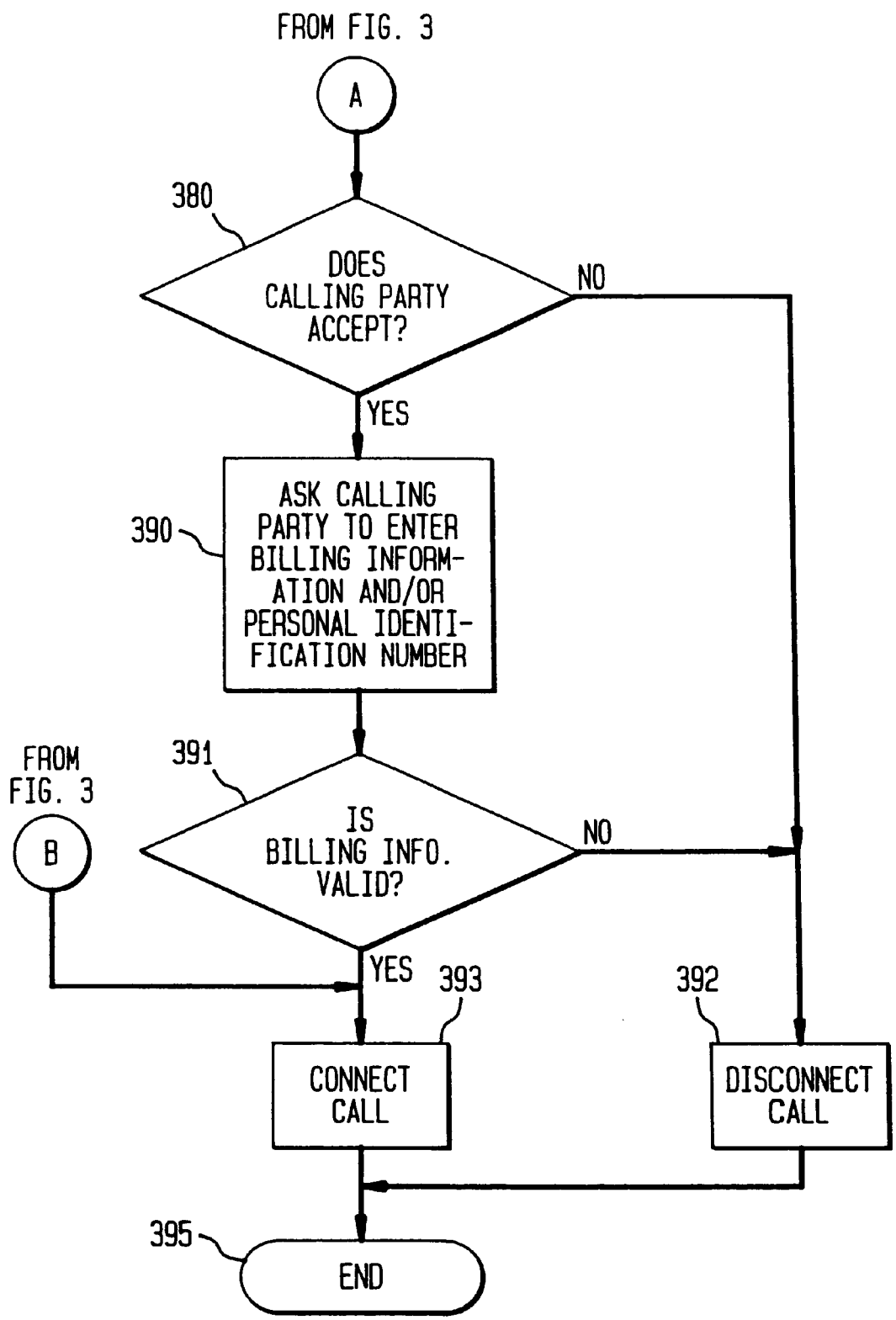

FIGS. 3 and 4 show a flowchart of the operation of the blocked call routing apparatus 12. In step 310, the controller 20 receives the call signals from the calling party via the network 16 through network interface 21. The controller 20 then determines the source type of the call based on the call signals received and goes to step 320.

In step 320, the controller 20 retrieves information from the database 13 corresponding to the called party's telephone number and the source type of the call and goes to step 330. In step 330, the controller 20 determines if calls from the determined source type to the called party's telephone number are blocked. If the call is not blocked, then controller 20 proceeds to step 393 where the call is connected to the called party; otherwise, controller 20 continues to step 340.

In step 340, the controller 20 sends a request message to the called party asking if they wish to accept the charges for completion of the call and goes to step 350. Then, in step 350, if the called party accepts the charges, the controller 20 goes to step 394 where the block is overridden and the called party is billed for completion of the call. If the called party declines the charges, controller 20 goes to step 360.

In step 360, the controller 20 sends a request message to the calling party informing them that an additional charge is required for competing the call and goes to step 370. In step 370, the controller 20 sends a message to the calling party asking if they wish to accept the charges for completion of the call and goes to step 380 (as shown in FIG. 4). In step 380, if the calling party does not accept the charges, the controller goes to step 392 where the call is disconnected. If the calling party accepts the charges, the controller 20 continues to step 390.

In step 390, the controller 20 requests that the calling party enter the billing information and/or personal identification number for billing of the additional charges and goes to step 391. In step 391, the controller 20 verifies the billing information and/or personal identification number entered in step 390. If the information is valid, controller 20 determines that an override condition has been acquired and continues to step 393; otherwise, controller 20 goes to step 392. In step 392, the controller 20 disconnects the call and goes to step 395 and ends. In step 393, the controller 20 overrides the block and connects the call. Control then goes to step 395 and ends.

The present invention according to the above embodiment allows a called party to control the types of calls that are received and billed to their account while still allowing callers the ability to access them if the callers agree to pay for the access. For example, 1-8YY service providers may block all calls from pay telephones yet allow callers from pay telephones to access their services when the caller agrees to pay the additional surcharges for access. In this way, service providers may minimize costs while still allowing customers the access they desire.

The above embodiment is described wherein the blocked call routing apparatus 12 determines the source and/or source type and checks if the source and/or source type is listed as being blocked based on the destination address entered. However, the present invention may also base the determination of whether the call is blocked on the destination address and/or destination type. The database 13 may include a listing of source and/or source types and corresponding restricted destination addresses and/or destination types or vice versa. Thus, the blocked call routing apparatus 12 may retrieve information from the database 13 based on both the destination address and/or destination type and the source and/or source type. Accordingly, the blocked call routing apparatus 12 may determine whether the call is blocked by determining the source and/or source type and the destination address and/or destination type and retrieve information from the database 13 based on the source and/or source type. The information retrieved may then include a listing of destination addresses and/or destination types that are blocked from that particular source and/or source type.

A practical example of the above embodiment is when multiple roommates share a single telephone line. In this situation, all outgoing long distance telephone calls may be blocked on the telephone line. However, the owner of the telephone line, i.e. the roommate to whom the telephone bills are addressed, may be provided with a personal identification number that allows him/her to make long distance telephone calls. Additionally, the other roommates may make long distance telephone calls when they accept the charges for the calls and provide proper billing information, such as their calling card number, credit card number, and the like.

Thus, in the above example, when a user wishes to make a long distance telephone call, the blocked call routing apparatus 12 will identify the source of the telephone call and the destination address. The blocked call routing apparatus 12 will retrieve information from the database 13 corresponding to the source of the telephone call and determine if the destination address and/or destination type is in a list of blocked destinations. If it is, the blocked call routing apparatus 12 will request that the calling party accept the charges and enter appropriate billing information and/or a personal identification number. In this way, each roommate may be billed for the calls he/she made.

As shown in FIG. 2, the method of this invention is preferably implemented on a programmed processor. However, the blocked call routing apparatus 12 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 3 and 4 can be used to implement the blocked call routing apparatus functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of routing a blocked call from at least one of a source device and a source device type through at least one network to a destination device, comprising:

receiving a call;

determining whether the call is to be blocked based on at least one of the source device and source device type;

acquiring an override condition if the call is a blocked call; and routing the blocked call to the destination device after the override condition is acquired, wherein the acquiring an override condition step includes sending a first request message to the destination device requesting that the override condition be provided and, if the override condition is not provided in response to the first request message, sending a second request message to the source device requesting that the override condition be provided.

2. The method of claim 1, further comprising:

acquiring a source device identifier and a destination device identifier; and determining if the call is blocked based on the source device identifier and the destination device identifier.

3. The method of claim 2, wherein the acquiring a source device identifier and a destination device identifier step includes obtaining at least one of a telephone number, a Number Plan Area of the telephone number and a device code of the source device and destination device.

4. The method of claim 2, wherein the determining step comprises:

retrieving database information from a database; and determining if at least one of the source device identifier and the destination device identifier are listed in the database information as being assigned to a blocked device.

5. The method of claim 1, wherein the override condition includes at least one of billing information, a personal identification number, a password, and a code.

6. The method of claim 5, wherein the billing information includes at least one of a telephone number, a calling card number, a credit card number and an account number.

7. A blocked call routing apparatus that routes blocked calls from at least one of a source device and source device type through at least one network to a destination device, the blocked call routing apparatus comprising:

a network interface through which calls are received from the at least one network; and a controller that determines whether the call is to be blocked based on at least one of the source device and source device type, wherein the controller acquires an override condition if the call is a blocked call and routes the blocked call to the destination device after the override condition is acquired and wherein the controller acquires an override condition by sending a first request message to the destination device requesting that the override condition be provided and, if the override condition is not provided in response to the first request message, sends a second request message to the source device requesting that the override condition be provided.

8. The blocked call routing apparatus of claim 7, wherein the controller acquires a source device identifier and a destination device identifier and determines if the call is a blocked call based on the source device identifier and the destination device identifier.

9. The blocked call routing apparatus of claim 8, wherein the controller acquires a source device identifier and a destination device identifier by determining at least one of a telephone number, a Number Plan Area of the telephone number, and a device code of the source device and destination device.

10. The blocked call routing apparatus of claim 8, wherein the controller determines if the call is a blocked call by:

retrieving database information from a database; and determining if at least one of the source device identifier and the destination device identifier are listed in the database information as being assigned to a blocked device.

11. The blocked call routing apparatus of claim 7, wherein the override condition includes at least one of billing information, a personal identification number, a password, and a code.

12. The method of claim 11, wherein the billing information includes at least one of a telephone number, a calling card number, a credit card number and an account number.

* * * * *